Patented June 9, 1936

2,043,640

UNITED STATES PATENT OFFICE 2,043,640

MANUFACTURE OF REFRACTORY ARTICLES

George Witty, Long Island City, N. Y., assignor to Construction Products Corporation, Wilmington, Del.

No Drawing. Application January 28, 1935, Serial No. 3,874. Renewed November 25, 1935

1 Claim. (Cl. 106—9)

This invention relates to the manufacture of refractory articles and, particularly, of bricks or blocks used to line steel furnaces and the like structures involving an intense heat.

Bricks that are now employed for such purposes are usually manufactured by combining certain selected materials which, when mixed, are rendered into a plastic condition, then molded, then dried and finally fired at high temperature. This method of manufacturing involves the very considerable loss of time required for the drying of the articles sufficiently to permit them to be set in the kilns; then there is the further period consumed in the burning; and then there is still further consumption of time involved in the cooling of the burned articles, and besides the element of time involved there is the expense of setting and burning the articles as well as the cost of fuel utilized to effect the burning, not to mention the continuing expense required in the upkeep of the kilns.

I have found that, by using new basic materials and different method of manufacture, refractory articles can be made self-drying and thereby obviate the necessity of firing the same, with the attendant expense and loss of time already mentioned. The present invention is therefore predicated upon the discovering that, by utilizing certain chemical elements and effecting a combination of these with the new basic materials used in the manufacture of the articles, such articles will self-harden to a degree equal to that resulting from the usual firing in a kiln.

Although numerous attempts have heretofore been made to use self-drying bricks in furnaces, such as rotary kilns, steel furnaces and the like, it has heretofore not been possible to make a self-drying brick capable of successful use in such furnaces. This has been due mainly to the presence in the finished bricks of moisture, air and other gases which under high heat of the furnace tend to rapidly disrupt the bricks. I have succeeded in making bricks which are free from all these internal disturbing factors, and which can be practically and successfully used in such furnaces.

My improved refractory articles are formed from a mixture comprising or consisting of dolomite, blast furnace slag, ganister and bauxite. When the composition is formed from raw ingredients, I preferably use 40 parts of dolomite, 30 parts of blast furnace slag, 20 parts of ganister and 10 parts of bauxite.

In forming the composition the raw ingredients are ground together and calcined at a high heat, preferably 2000° F. or higher. The resultant calcined mixture is then moistened with a solution made of equal parts of calcium magnesium chloride and aluminum chloride; of 20 to 30 B, and sufficient quantity of water is added to render the mixture plastic. I have found by experiments and tests that when the calcined mixture is combined with the calcium magnesium chloride and aluminum chloride in liquid state and then moistened with water, a recognizable chemical action occurs. The resultant combination may be called oxychloride.

Following the stage of operation, the mass is molded into bricks, blocks or the like of appropriate forms and dimensions, and subjected to heavy pressure. Being then relieved from the pressure, the molded bricks are transferred into a steam chamber and dried at a temperature of 200° to 400° F., but in no case is there any firing or burning operation to effect its hardening.

While I have hereinabove described the method as for the production of bricks, or blocks for furnace linings and the like, nevertheless it is to be understood that the method is likewise useful for the manufacture of other article, the form and type of which is determined by the molding or shaping of the same according to their individual use.

It will be observed that although certain specific materials set forth, the invention is not necessarily limited thereto, but includes other proportions and other materials having similar properties and characteristics.

Having now described my invention, what I claim as new and useful is:

The method of manufacturing refractory articles, such as furnace-lining bricks by calcining 40 parts of dolomite, 30 parts of blast furnace slag, 20 parts ganister and 10 parts of bauxite, moistening the same with a liquid solution composed of equal parts of calcium magnesium chloride and aluminum chloride to chemically bind these elements and to render the same of proper consistency, molding the mixture into bricks and drying the same at a temperature between 200° and 400° F.

GEORGE WITTY.